2,727,067

PREPARATION OF PHOSPHINODITHIOIC ACID ANHYDRIDES BY HEATING THE CORRESPONDING ACIDS

Willis G. Craig, Willoughby, and Clark O. Miller, Cleveland, Ohio, assignors to The Lubrizol Corporation, Wickliffe, Ohio, a corporation of Ohio No Drawing. Application January 26, 1954,
Serial No. 406,325

7 Claims. (Cl. 260—545)

This invention relates as indicated to "anhydrides" of phosphinodithioic (dithiophosphinic) acids and more particularly to a process for the preparation of said anhydrides.

The term "phosphinodithioic acid" as used herein refers to a molecule which conforms to the structural formula:

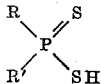

wherein R and R' are the same or different organic radicals attached to phosphorus through a carbon atom, preferably hydrocarbon radicals from 1 to 30 carbon atoms, especially cyclic hydrocarbon radicals, and most desirably aryl radicals. In the following table are given examples of R and R' in the above formula:

TABLE (1) Aliphatic radicals, for example:
  Alkyl radicals, e. g.:
    Methyl
    Ethyl
    Propyl (n- and iso-)
    Butyl (n-, sec-, iso-, and tert-)
    Amyl (n-, sec-, iso-, and tert-)
    Hexyl radicals, e. g.:
      n-Hexyl
      Sec-hexyl
      2,2-dimethyl-3-butyl
      2,2-dimethyl-4-butyl
      2,3-dimethyl-2-butyl
      2-methyl-1-pentyl
      2-methyl-2-pentyl
      3-methyl-1-pentyl
      3-methyl-2-pentyl, etc.
    Heptyl radicals, e. g.:
      n-Heptyl
      Sec-heptyl
      2,3-dimethyl-3-pentyl
      2,4-dimethyl-2-pentyl
      2,4-dimethyl-3-pentyl
      2,2,3-trimethyl-3-butyl
      3-ethyl-2-pentyl
      2-methyl-2-hexyl, etc.
    Octyl radicals, e. g.:
      n-Octyl
      2-ethyl-hexyl
      Diisobutyl
      Capryl
    Nonyl radicals, e. g.:
      Di-iso-butyl-carbinyl
      n-Nonyl
    Decyl radicals, e. g.: n-decyl
    Dodecyl radicals, e. g.: lauryl
    Tetradecyl radicals, e. g.: myristyl
    Hexadecyl radicals, e. g.: cetyl
    Octadecyl radicals, e. g.: stearyl
    Alkyl radicals having the formula $C_nH_{2n+1}$ where $n$ is an integer from 18 to 38 inclusive, e. g., those derived from paraffin wax, mineral oils and petrolatum
  Alkenyl radicals, e. g.:
    Vinyl
    Propenyl radicals, e. g.:
      Allyl
      Iso-propenyl
    Butenyl radicals, e. g.:
      n-Butenyl-1
      n-Butenyl-2
      n-Butenyl-3
      Iso-butenyl
    Pentenyl radicals, e. g.:
      n-Pentenyl-1
      n-Pentenyl-2
      n-Pentenyl-3
    Hexenyl radicals, e. g.:
      n-Hexenyl-1
      n-Hexenyl-2, etc.
      4,4-dimethyl-butenyl-2
      3,4-dimethyl-butenyl-1, etc.
    Heptenyl radicals, e. g.: n-heptenyl
    Octenyl radicals, e. g.:
      n-Octenyl
      Diisobutenyl
    Nonenyl radicals, e. g.: n-nonenyl
    Decenyl radicals, e. g.: n-decenyl
    Dodecenyl radicals, e. g.:
      n-Dodecenyl
      triisobutenyl
    Alkenyl radicals having the formula $C_nH_{2n-1}$ where $n$ is an integer from 18 to 38 inclusive, e. g. those derived from paraffin wax, mineral oils, and petrolatum
(2) Cycloaliphatic radicals, for example:
  Cycloalkyl radicals, e. g.:
    Cyclopentyl, alkylated-cyclopentyl, cyclohexyl, and alkylated-cyclohexyl radicals, e. g.:
      Mono- and poly-methyl-cyclopentyl radicals
      Mono- and poly-methyl-cyclohexyl radicals
      Mono- and poly-ethyl-cyclohexyl radicals
      Mono- and poly-iso-propyl-cyclohexyl radicals
      Mono- and poly-tert-amyl-cyclohexyl radicals
      n-Octyl-cyclohexyl radicals
      Diisobutyl-cyclohexyl (i. e., "tert-octyl"—cyclohexyl) radicals
      Nonyl-cyclohexyl radicals
      Diiso-amyl-cyclohexyl radicals
      Lauryl-cyclohexyl radicals
      Cetyl-cyclohexyl radicals
    Naphthenyl radicals
    Hydroabietyl radicals
  Cycloalkenyl radicals, e. g.:
    Cyclopentenyl, alkylated-cyclopentenyl, cyclohexenyl, and alkylated-cyclohexenyl radicals, e. g.:
      Mono- and poly-methyl-cyclopentenyl radicals
      Mono- and poly-methyl-cyclohexenyl radicals
      Mono- and poly-ethyl-cyclohexenyl radicals
      Mono- and poly-iso-propyl-cyclohexenyl radicals
      Mono- and poly-tert-amyl-cyclohexenyl radicals
      n-Octyl-cyclohexenyl radicals
      Diisobutyl-cyclohexenyl radicals
      Nonyl-cyclohexenyl radicals
      Diiso-amyl-cyclohexenyl radicals
      Lauryl-cyclohexenyl radicals
      Cetyl-cyclohexenyl radicals
    Dehydronaphthenyl radicals
    Abietyl radicals
(3) Aryl- and cycloalkyl-substituted aliphatic radicals, for example:
  (a) Phenyl- and alkyl-phenyl-substituted alkyl radicals, e. g.:
    Benzyl
    Methyl-benzyl
    Capryl-benzyl
    Diisobutyl-benzyl
    Phenyl-ethyl
    Phenyl-propyl
    Phenyl-octadecyl
  (b) Xenyl- and alkyl-xenyl-substituted alkyl radicals, e. g.:
    Xenyl-methyl
    Capryl-xenyl-methyl
    Xenyl-ethyl
    Diisobutyl-xenyl-methyl
  (c) Naphthyl- and alkyl-naphthyl-substituted alkyl radicals, e. g.:
    Naphthyl-methyl
    Tert-amyl-naphthyl-methyl
    Naphthyl-ethyl
    Cetyl-naphthyl-ethyl
  (d) Cyclohexyl- and alkyl-cyclohexyl-substituted alkyl radicals, e. g.:
    Cyclohexyl-ethyl
    Methyl-cyclohexyl-ethyl
    Ethyl-cyclohexyl-ethyl
    Cyclohexyl-propyl
    Tert-amyl-cyclohexyl-butyl
(4) Oxygen containing aliphatic and cycloaliphatic radicals, for example:
  (a) Oxygen-containing aliphatic radicals, e. g.:
    Alkoxy-substituted alkyl radicals, e. g.:
      Propoxy-ethyl radicals, e. g.:
        n-Propoxy-ethyl
        Iso-propoxy-ethyl
      Butoxy-ethyl radicals, e. g.:
        n-Butoxy-ethyl
        Iso-butoxy-ethyl
        Tert-butoxy-ethyl
      Octoxy-ethyl radicals, e. g.:
        n-Octoxy-ethyl
        Diisobutoxy-ethyl
      Di-butoxy-propyl radicals, e. g.:
        2,3-di-n-butoxy-propyl
        3,3-di-iso-butoxy-propyl
      Di-octoxy-propyl radicals, e. g.:
        3,3-di-n-octoxy-propyl
        2,3-bis-(diisobutoxy)-propyl
    Cycloalkoxy-substituted alkyl radicals, e. g.:
      Cyclohexoxy-methyl
      Cyclohexoxy-ethyl radicals, e. g.:
        Beta-cyclohexoxy-ethyl
        Alpha-cyclohexoxy-ethyl
      Cyclohexoxy-butyl radicals, e. g.:
        2-(cyclohexoxy)-butyl
        2,3-di-cyclohexoxy-butyl
      Methyl-cyclohexoxy-propyl radicals, e. g.:
        2-(o-methyl-cyclohexoxy)-propyl
        2-(p-methyl-cyclohexoxy)-propyl
      Butyl-cyclohexoxy-ethyl radicals, e. g.:
        Beta-(p-tert-butyl-cyclohexoxy)-ethyl
        Alpha-(o-sec-butyl-cyclohexoxy)-ethyl
      Cyclopentoxy-ethyl radicals, e. g.:
        Alpha-cyclopentoxy-ethyl
        Beta-cyclopentoxy-ethyl
      Propyl-cyclopentoxy-methyl radicals, e. g.:
        Iso-propyl-cyclopentoxy-methyl radicals
        n-Propyl-cyclopentoxy-methyl radicals Alkenoxy-substituted alkyl radicals, e. g.:
  Propenoxy-ethyl radicals, e. g.:
    Allyloxy-ethyl
    Iso-propenoxy-ethyl
  Octenoxy-ethyl radicals, e. g.: diisobutenoxy-ethyl
  Di-octenoxy-propyl radicals, e. g.: 2,3-bis-(diisobutenoxy)-propyl
Epoxy-alkyl radicals, e. g.:
  Epoxy-propyl
  Epoxy-butyl radicals, e. g.:
    2,3-epoxy-n-butyl
    3,4-epoxy-n-butyl Carboalkoxy-alkyl radicals (R—O—$\overset{\overset{O}{\|}}{C}$—R'—), e. g.:

Carbomethoxy-methyl (CH$_3$—O—$\overset{\overset{O}{\|}}{C}$—CH$_2$—)
  Carboethoxy-ethyl
  Carbolauroxy-ethyl
Aroxy substituted alkyl radicals, for example phenoxy- and alkyl-phenoxy-substituted alkyl radicals, e. g.:
  Phenoxy-methyl
  Phenoxy-ethyl
  Cetyl-phenoxy-ethyl
  Phenoxy-phenethyl
  Capryl-phenoxy-phenethyl
(b) Oxygen-containing cycloaliphatic radicals, e. g.:
Alkoxy-, alkenoxy-, and aroxy-substituted cycloalkyl radicals, e. g.:
  Alkoxy-substituted cyclopentyl radicals, e. g.:
    Mono- and poly-ethoxy-cyclopentyl
    Octoxy-cyclopentyl radicals, e. g.: diisobutoxy-cyclopentyl
  Alkoxy-substituted cyclohexyl radicals, e. g.:
    Mono- and poly-methoxy-cyclohexyl
    Octoxy-cyclohexyl radicals, e. g.: diisobutoxy-cyclohexyl
  Alkenoxy-substituted cyclopentyl radicals, e. g.:
    Propenoxy-cyclopentyl radicals, e. g.:
      Allyloxy-cyclopentyl
      Iso-propenoxy-cyclopentyl
  Alkenoxy-substituted cyclohexyl radicals, e. g.:
    Vinyloxy-cyclohexyl
    Propenoxy-cyclohexyl radicals, e. g.:
      Allyloxy-cyclohexyl
      Iso-propenoxy-cyclohexyl
    Octenoxy-cyclohexyl radicals, e. g.: diisobutenoxy-cyclohexyl
  Aroxy-substituted cyclopentyl radicals, e. g.:
    Phenoxy-cyclopentyl
    Poly-phenoxy-cyclopentyl radicals, e. g.:
      Di-phenoxy-cyclopentyl radicals
      Tetra-phenoxy-cyclopentyl radicals
    Ethyl-phenoxy-cyclopentyl radicals, e. g.:
      o-Ethyl-phenoxy-cyclopentyl
      p-Ethyl-phenoxy-cyclopentyl
    Naphthoxy-cyclopentyl
    Amyl-naphthoxy-cyclopentyl radicals, e. g.:
      Tert-amyl-alpha-naphthoxy-cyclopentyl radicals
      n-Amyl-beta-naphthoxy-cyclopentyl radicals
  Aroxy-substituted cyclohexyl radicals, e. g.:
    Phenoxy-cyclohexyl
    Poly-phenoxy-cyclohexyl radicals, e. g.:
      Di-phenoxy-cyclohexyl radicals
      Tri-phenoxy-cyclohexyl radicals
    Butyl-phenoxy-cyclohexyl radicals, e. g.:
      p-Tert-butyl-phenoxy-cyclohexyl
      n-Butyl-phenoxy-cyclohexyl
    Naphthoxy-cyclohexyl radicals, e. g.:
      Alpha-naphthoxy-cyclohexyl
      Beta-naphthoxy-cyclohexyl
    Methyl-naphthoxy-cyclohexyl radicals
    Propyl-naphthoxy-cyclohexyl radicals, e. g.:
      Iso-propyl-alpha-naphthoxy-cyclohexyl radicals
      n-Propyl-beta-naphthoxy-cyclohexyl radicals
Epoxy-cycloalkyl radicals, e. g.:
  Epoxy-cyclopentyl
  Epoxy-cyclohexyl
Carboalkoxy-cycloalkyl radicals, e. g.:

Carboethoxy-cyclopentyl, C$_5$H$_9$—O—$\overset{\overset{O}{\|}}{C}$—⬠

Carbomethoxy-cyclohexyl
  Carbolauroxy-cyclohexyl
(5) Aliphatic and cycloaliphatic radicals containing inorganic elements. (Examples of such inorganic elements are: halogens, metals, metalloids, e. g.: selenium, silicon, sulphur.) Examples of such radicals are:
  (a) Aliphatic radicals containing inorganic elements, for example:
    Alkyl radicals containing halogen, e. g.:
      2-fluoro-ethyl
      2-chloro-ethyl
      2-iodo-ethyl
      Chloro-pentyl radicals, e. g.:
        5-chloro-n-pentyl
        3,5-di-chloro-n-pentyl
      Bromo-octyl radicals, e. g.:
        3-bromo-n-octyl
        3,4-di-bromo-n-octyl
    Alkenyl radicals containing halogen, e. g.:
      Chloro-propenyl radicals, e. g.:
        2-chloro-allyl
        chloro-iso-propenyl
      Bromo-butenyl radicals, e. g.:
        4-bromo-crotyl
        4,4-di-bromo-crotyl
      Chloro-octenyl radicals, e. g.: mono- and poly-chloro-diisobutenyl Alkyl radicals containing metal, e. g.:
  Radicals derived from metal alkoxides, e. g.:
    M—O—(CH$_2$)$_8$—
    M—O—(CH$_2$)$_{18}$—
  Radicals derived from metal alkylcarboxylates, e. g.:

$$M—O—\overset{\overset{O}{\|}}{C}—(CH_2)_{16}—$$

in which M represents one equivalent of a metal.
  Examples of such metals are:
    The alkali metals
    The alkaline-earth metals
    Cu and Ag
    Zn, Cd and Hg
    Al, Fe, Co, Ni
    Sn, Pb
    Sb, Bi
    Mn
Alkyl radicals containing silicon, e. g.:

$$\underset{C_2H_5}{\underset{|}{\overset{C_2H_5}{\overset{|}{C_2H_5—Si—CH_2CH_2—}}}}$$

Alkyl radicals containing sulphur, e. g.:

C$_2$H$_5$—S—CH$_2$CH$_2$—

CH$_3$—CH—CH$_2$—
        |
        S

C$_2$H$_5$—S$_2$—C$_2$H$_4$—
  C$_4$H$_9$—S$_2$—C$_4$H$_8$—
  C$_8$H$_{17}$—S$_2$—C$_8$H$_{16}$—
Alkyl radicals containing selenium, e. g.:
  C$_2$H$_5$—Se—CH$_2$CH$_2$—
  C$_4$H$_9$—Se—C$_4$H$_8$—
(b) Cycloaliphatic radicals containing inorganic elements, for example:
Cycloalkyl- and alkylated-cycloalkyl radicals containing halogen, e. g.:
  Mono- and poly-chloro-cyclopentyl
  Mono- and poly-chloro-methyl-cyclohexyl
  4-tert-amyl-2,6-di-bromo-cyclohexyl
  4-capryl-2-fluoro-cyclohexyl
  4-diisobutyl-2-iodo-cyclohexyl
Cycloalkenyl- and alkylated-cycloalkenyl radicals containing halogen, e. g.:
  Mono- and poly-chloro-cyclopentenyl
  Mono- and poly-chloro-methyl-cyclohexenyl
  4-tert-butyl-2-bromo-cyclohexenyl
  4-capryl-2-fluoro-cyclohexenyl
  4-diisobutyl-2-iodo-cyclohexenyl
Cycloalkyl radicals containing metal, e. g.:
  Radicals derived from metal cycloalkoxides, e. g.:

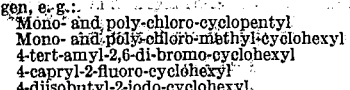

Radicals obtained on the removal of a hydrogen atom from the cycloaliphatic nucleus of, e. g.:
    Potassium cycloalkoxide of petroleum naphthenyl alcohol
    Lithium cycloalkoxide of hydroabietyl alcohol
  Radicals derived from methyl cycloalkyl-carboxylates, e. g.:

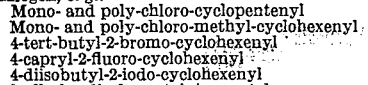

Radicals obtained on the removal of a hydrogen atom from the cycloaliphatic nucleus of, e. g.:
    Sodium salt of petroleum naphthenic acids
    Lithium salt of hydroabietic acid
Cycloalkyl radicals containing silicon, e. g.:

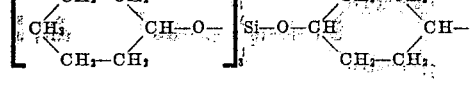

Cycloalkyl radicals containing sulphur, e. g.:

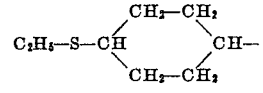

Radicals obtained on the removal of a hydrogen atom from the cycloaliphatic nucleus of amyl thiol-naphthenate
Cycloalkyl radicals containing selenium, e. g.:

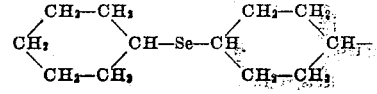

(6) Aromatic radicals, including aryl radicals, unsubstituted and substituted, including mono- and polyalkylated and cyclo-alkylated aromatic nuclei, e. g.:
Phenyl
Cresyl
Xylyl
Mesityl
Ethyl-phenyl
Di-ethyl-phenyl
Iso-propyl-phenyl
n-Propyl-phenyl
Tert-butyl-phenyl
Di-tert-butyl-phenyl
Iso-butyl-phenyl
n-Butyl-phenyl
Tert-amyl-phenyl
Cyclohexyl-phenyl
Methyl-cyclohexyl-phenyl
Capryl-phenyl
Diisobutyl-phenyl
Lauryl-phenyl
Cetyl-phenyl
Paraffin wax-substituted phenyl
Nitro-phenyl
Mono-chloro-phenyl
Poly-chloro-phenyl, e. g.: dichloro-phenyl, trichloro-phenyl
Hydroxy phenyl
Acetyl-phenyl
Carbolauroxy-phenyl
Lauroxy-phenyl
Xenyl
Mono- and poly-chloro-xenyl
Capryl-xenyl
Phenoxy-phenyl
Thiophenoxy-phenyl
Diisobutyl-phenoxy-phenyl
Naphthyl
Mono- and poly-chloro-naphthyl
Cetyl-naphthyl
Anthracyl
Mono- and poly-chloranthracyl
Phenanthryl
Mono- and poly-chloro-phenanthryl
Lauryl-phenanthryl
MO-Ph-R-, where M is one equivalent of a metal (e. g. those listed under (5) above), Ph is the benzene ring, and R is a divalent aliphatic radical, e. g.:
Alkylene radicals, e. g.:
Methylene
Ethylene
Propylene, etc.

(7) Aromatic radicals having more than one kind of substituent, e. g.:
Alkyl-hydroxy-aryl radicals, e. g.:
Mono-methyl-hydroxy-phenyl radicals
Poly-methyl-hydroxy-phenyl radicals, e. g.:
Di-methyl-hydroxy-phenyl radicals
Tri-methyl-hydroxy-phenyl radicals
Mono-ethyl-hydroxy-phenyl radicals
Poly-ethyl-hydroxy-phenyl radicals
Di-ethyl-hydroxy-phenyl radicals
Tri-ethyl-hydroxy-phenyl radicals
Mono-butyl-hydroxy-phenyl radicals, e. g.:
Tert-butyl-hydroxy-phenyl radicals
Sec-butyl-hydroxy-phenyl radicals
Poly-butyl-hydroxy-phenyl radicals, e. g.: di-tert-butyl-hydroxy-phenyl radicals
Mono-methyl-dihydroxy-phenyl radicals
Poly-methyl-dihydroxy-phenyl radicals, e. g.:
Di-methyl-dihydroxy-phenyl radicals
Tri-methyl-dihydroxy-phenyl radicals
Mono-propyl-hydroxy-naphthyl radicals, e. g.: mono-isopropyl-alpha-hydroxy-naphthyl radicals
Poly-propyl-hydroxy-naphthyl radicals, e. g.: di-n-propyl-beta-hydroxy-naphthyl radicals
Alkyl-chloro-aryl radicals, e. g.:
Methyl-monochloro-phenyl radicals
Methyl-polychloro-phenyl radicals, e. g.:
Methyl-dichloro-phenyl radicals
Methyl-trichloro-phenyl radicals
Ethyl-monochloro-anthracyl radicals, e. g.:
Ethyl-monochloro-alpha-anthracyl radicals
Triethyl-monochloro-beta-anthracyl radicals
Ethyl-polychloro-anthracyl radicals, e. g.:
Ethyl-dichloro-alpha-anthracyl radicals
Diethyl-trichloro-beta-anthracyl radicals
Alkyl-nitro-aryl radicals, e. g.:
Methyl-nitro-phenyl radicals
Dimethyl-nitro-phenyl radicals
Ethyl-dinitro-phenyl radicals
Butyl-nitro-naphthyl radicals, e. g.:
Tert-butyl-nitro-naphthyl radicals
Sec-butyl-dinitro-naphthyl radicals
Propyl-nitro-phenanthryl radicals, e. g.:
Isopropyl-dinitro-phenanthryl radicals
Di-n-propyl-dinitro-phenanthryl radicals Compounds which contain the elements of sulphur and phosphorus are generally quite useful as adjuvants to lubricating oils for the purpose of imparting extreme pressure properties or inhibiting oxidation and corrosion. The compounds which are the principal subject of this invention contain a minimum of two atoms of phosphorus and three atoms of sulphur per molecule, and possess such valuable properties as mentioned above. In addition to their usefulness in motor oils, gear oils, and similar lubricants they may also be used as metal-flotation agents, rubber accelerator activators, and pest control agents.

It is an object of this invention to provide a process for the manufacture of new compositions of matter. A more specific object is the preparation of anhydrides of phosphinodithioic acids from phosphinodithioic acids by means of a cheap and efficient method. Other objects will become apparent as the following description proceeds.

These objects are accomplished according to our invention by a thermal process which involves the elimination of the elements of hydrogen sulphide from a material comprising at least one phosphinodithioic acid. The overall process is unusually simple and economical, inasmuch as no catalysts are required and the purification procedure is neither lengthy nor complicated. The reaction rate for this conversion is sufficiently fast so that the time required for batch-wise operation of the process is relatively short; generally from one-half to eight hours and more often from one to three hours. Furthermore the nature of the reaction is such that the process lends itself to a continuous operation and the process is readily adaptable to this more convenient mode of handling.

The detailed procedure consists in heating a phosphinodithioic acid at such a temperature that hydrogen sulphide gas is evolved at a reasonably constant and vigorous rate. Agitation of the reaction mixture allows better temperature control and a more uniform reaction rate, and as a consequence of these, a higher yield of product, although the rapid evolution of hydrogen sulphide itself often provides sufficient agitation within the reaction mixture to give satisfactory results. When the evolution of hydrogen sulphide has become negligible the reaction may be considered, for the purposes of this invention, to be at an end. At this point the product mixture usually is a dark green, viscous liquid with a slight, not unpleasant odor. After washing with an alcohol it may, in most instances, be crystallized from a hot alcoholic solution. The product obtained from this procedure is sufficiently pure for the uses mentioned previously. Further purification, although generally unnecessary for the purposes of this invention, may be effected by recrystallization from the same or different alcohols.

The progress of the reaction may be observed by periodic determination of the relative acidity of the reaction mixture. Thus, the overall conversion of a phosphinodithioic acid to the corresponding anhydride is marked by the disappearance of acid groups and may be represented by the following equation:

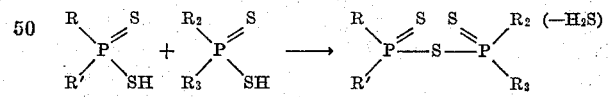

where R, R', $R_2$ and $R_3$ are the same or different organic radicals, as defined hereinbefore.

As the reaction proceeds the amount of phosphinodithioic acid is diminished and so the acid number, which is a measure of relative acidity, is diminished correspondingly. The acid number will drop, in the case of diphenyl phosphinodithioic acid for example, from about 210 to about 70, at which point the evolution of hydrogen sulfide is so slight as to be negligible. Thus in the ordinary practice of this invention the process is allowed to proceed until the acid number of the product mixture has decreased substantially, preferably to an approximately constant value. The temperatures which may be employed for the preparation of phosphinodithioic acid anhydrides cover a fairly wide range. At temperatures as low as 100° C. there is observed an appreciable drop in the acid number of diphenylphosphinodithioic acid; e. g. a drop from an acid number of 203 to a value of 187 after 18 hours. Higher temperatures, however, allow a much faster reaction and in most cases it is desirable to employ temperatures of not less than 130° C. Lower temperatures than 130° C. may be used, but the lethargy of a reaction run at such a low temperature renders the process uneconomical. The upper limit of temperature is governed not only by the violence of the reaction but also by the problems of decomposition. Thus in an experiment involving diphenylphosphinodithioic acid at 250° C. the acid number was observed to drop from 203 to 69 within the first hour of such heating and to rise thereafter to 73 during the second hour and thence to 79 during the third hour at this temperature.

This rise in the acid number is interpreted to mean that acidic products of decomposition are being formed at a faster rate than phosphinodithioic acid is being converted to the corresponding anhydride. The values given above indicate that while 250° C. is a very satisfactory temperature for the process of this invention, higher temperatures than 250° C. will be increasingly less satisfactory. In general then it can be seen that temperatures within the range of 130–250° C. are satisfactory for the thermal conversion of phosphinodithioic acids to phosphinodithioic acid anhydrides.

The acids which are used as raw materials are commonly prepared by use of the Grignard reagent, as shown below:

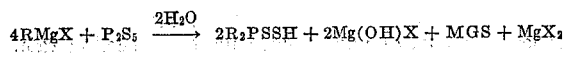

The aliphatic phosphinodithioic acids are prepared via the above scheme in refluxing ethyl ether solution whereas the aromatic phosphinodithioic acids are prepared at somewhat higher temperatures, usually about 100° C.

Alternatively these acids may in some cases be prepared more conveniently by sulfurizing secondary phosphines, as illustrated by the following equation:

The procedure for carrying out the above indicated reaction consists simply in warming the particular phosphine with elemental sulfur in an inert atmosphere.

Another method for preparing the phosphinodithioic acids is set forth in the co-pending application of Miller et al., Serial No. 406,323, for "Organic Phosphinodithioic Acid Compounds and Methods for Preparing Same," owned by the same assignee.

It is apparent that the scope of the invention includes the preparation not only of symmetrical molecules such as resulted from the use of pure phosphinodithioic acids, but also of unsymmetrical anhydride molecules which resulted from the use of a mixture of two or more phosphinodithioic acids. In the latter case, if a mixture of two phosphinodithioic acids, A and B, is treated according to the practice of this invention the product mixture is apt to contain three distinct products, viz. the anhydride which contains two A residues, the anhydride which contains two B residues, and the anhydride which contains both an A residue and a B residue.

The invention contemplates also the use of phosphinodithioic acids which contain dissimilar organic radicals. Such acids, while not readily available are nevertheless members of the broad class of phosphinodithioic acids, which are the subject of this invention. Specific examples of this type of compound include: ethylmethylphosphinodithioic acid, isopropylmethylphosphinodithioic acid, n-butylisopropylphosphinodithioic acid, cyclopentylethylphosphinodithioic acid, cyclohexylisobutylphosphinodithioic acid, cyclohexylcyclopentylphosphinodithioic acid, methylphenylphosphinodithioic acid, phenyl(n-propyl)phosphinodithioic acid, cyclopentylphenylphosphinodithioic acid, cyclohexylphenylphosphinodithioic acid, (methylcyclohexyl)tolylphosphinodithioic acid, phenyltolylphosphinodithioic acid, benzylphenylphosphinodithioic acid, methyl(betaphenethyl)phosphinodithioic acid, etc.

The broad features of this invention having been set forth, the following examples are now presented to clarify some of the details thereof:

Example 1

A sample of diphenylphosphinodithioic acid, weighing 250 grams (1.0 mole) was warmed with agitation to 170° C. and these conditions were maintained for a period of two hours. During this time the acid number dropped from 210 to 92. The dark green reaction product was allowed to cool to approximately room temperature, whereupon 100 milliliters of cold methanol was added and the resultant mixture was stirred for a few seconds. The dark syrupy liquid became partially crystalline, and upon decanting the methanol away and washing with a second 100-milliliter portion of methanol the entire mass crystallized. This product was subsequently recrystallized from 500 milliliters of isopropanol to yield 198 grams (85.0 percent of the theory) of a white crystalline product which melted at 105–110° C. A sample of this product, diphenylphosphinodithioic acid anhydride, crystallized twice more from isopropanol melted at 115–116.5° C.

Example 2

The procedure of Example 1 was repeated at 250° C. for one hour. The corresponding yield of product, melting at 106–110° C., was 191 grams (82.0 percent of the theory).

Example 3

The procedure of Example 1 was repeated at 130° C. for five hours. The corresponding yield of product, melting at 100–107° C., was 140.5 grams (60.3 percent of the theory).

Having described my invention and furnished specific examples thereof, no undue limitations or restrictions should be placed on the scope of my invention except to the extent as defined in the appended claims.

Other modes of applying the principle of the invention may be employed, change being made as regards the details described, provided the features stated in any of the following claims or the equivalent of such be employed.

We therefore particularly point out and distinctly claim as our invention:

1. The process for preparing anhydrides of phosphinodithioic acids which comprises heating at least one phosphinodithioic acid having the structure

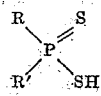

wherein R and R' are the same or different non-functional organic radicals attached to phosphorus through a carbon atom, above about 100° C. but below the decomposition temperature of the constituents of the reaction mixture to eliminate hydrogen sulfide.

2. The process for preparing anhydrides of organic phosphinodithioic acids which comprises heating at least one phosphinodithioic acid having the structure

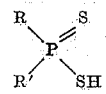

wherein R and R' are the same or different non-functional organic radicals attached to phosphorus through a carbon atom, within a temperature range of from about 130° C. to about 250° C. until the acid number of the product mixture has decreased substantially.

3. The process of claim 2 further characterized in that the phosphinodithioic acid is heated for a period of time from about ½ to about 8 hours.

4. The process of claim 2 further characterized in that the organic radicals are hydrocarbon radicals.

5. The process of claim 2 further characterized in that the organic radicals are cyclic hydrocarbon radicals.

6. The process of claim 2 further characterized in that the organic radicals are aryl radicals.

7. The process of claim 2 further characterized in that the organic radicals are phenyl radicals.

References Cited in the file of this patent

UNITED STATES PATENTS 2,198,915    MacAfee _____ Apr. 30, 1940

OTHER REFERENCES

Kosolapoff et al.: 73 J. A. C. S., 4101.